United States Patent
Aoki

(10) Patent No.: US 8,941,878 B2
(45) Date of Patent: *Jan. 27, 2015

(54) PAGE DESCRIPTION DATA PROCESSING APPARATUS, PAGE DESCRIPTION DATA PROCESSING METHOD, AND RECORDING MEDIUM

(75) Inventor: Yasuharu Aoki, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

This patent is subject to a terminal disclaimer.

(21) Appl. No.: 13/074,297

(22) Filed: Mar. 29, 2011

(65) Prior Publication Data

US 2011/0242552 A1   Oct. 6, 2011

(30) Foreign Application Priority Data

Mar. 30, 2010   (JP) .................................. 2010-079463

(51) Int. Cl.
 *G06K 15/22* (2006.01)
 *G06T 11/60* (2006.01)
 *G06T 11/20* (2006.01)

(52) U.S. Cl.
 CPC .............. *G06T 11/60* (2013.01); *G06T 11/203* (2013.01)
 USPC ............ 358/1.3; 358/453; 358/523; 345/156; 345/420; 345/467; 345/611; 382/149; 382/243

(58) Field of Classification Search
 CPC combination set(s) only.
 See application file for complete search history.

(56) References Cited

U.S. PATENT DOCUMENTS

| | | | | |
|---|---|---|---|---|
| 6,323,969 | B1 * | 11/2001 | Shimizu et al. | 358/523 |
| 2005/0007611 | A1 * | 1/2005 | Matsukubo et al. | 358/1.9 |
| 2005/0035976 | A1 * | 2/2005 | Ecob et al. | 345/611 |
| 2006/0008114 | A1 * | 1/2006 | Sekiguchi et al. | 382/100 |
| 2007/0229454 | A1 * | 10/2007 | Yamauchi | 345/156 |
| 2007/0279705 | A1 * | 12/2007 | Takiyama et al. | 358/453 |
| 2008/0297814 | A1 * | 12/2008 | Jacobs et al. | 358/1.9 |
| 2011/0116136 | A1 * | 5/2011 | Tamura | 358/3.06 |

FOREIGN PATENT DOCUMENTS

| | | |
|---|---|---|
| JP | 04086960 A | 3/1992 |
| JP | 08138068 A | 5/1996 |
| JP | 08147482 A | 6/1996 |
| JP | 09006972 A | 1/1997 |
| JP | 10063867 A | 3/1998 |
| JP | 11085428 A | 3/1999 |
| JP | 11143450 A | 5/1999 |

(Continued)

OTHER PUBLICATIONS

"Adobe Portable Document Format Version 1.3", PDF Reference, second edition, 1st printing, ISBN 0-201-61588-6, Jul. 2000, pp. 136- and 141-143 indicated in the specification on pp. 2-3.

(Continued)

*Primary Examiner* — Tammy Pham
*Assistant Examiner* — Idowu O Osifade
(74) *Attorney, Agent, or Firm* — Sughrue Mion, PLLC

(57) ABSTRACT

With respect to an object that strokes a path existing in page description data, the position of a start point of a line element formed along the path is estimated based on a path construction operator and a dotted line pattern determining operator. If the distance between the start point and an end point of the path is equal to or less than a prescribed threshold value, the position of the end point of the path is changed to another position along the path in order to increase the distance.

7 Claims, 11 Drawing Sheets

(56) References Cited

FOREIGN PATENT DOCUMENTS

| | | |
|---|---|---|
| JP | 2005-070957 A | 3/2005 |
| JP | 2006048215 A | 2/2006 |

OTHER PUBLICATIONS

"Adobe Portable Document Format Version 1.3", initial edition, 1st printing, ISBN 0-201-61588-6, Jul. 2000, p. 139, indicated in the specification on p. 24.

Rejection of the Application, dated Jul. 30, 2013, issued in related JP Application No. 2010-079466, 6 pages in English and Japanese.

PostScript Language Reference Manual, Second Edition, Adobe Systems Incorporated, published Dec. 21, 1991, first edition, pp. 167-174, p. 184, p. 482, p. 583, p. 586, pp. 592-596, and p. 623 and the pertinent portions of the English version.

Rejection of the Application, dated May 28, 2013, issued in corresponding JP Application No. 2010-079463, 7 pages in English and Japanese.

\* cited by examiner

PAGE DESCRIPTION DATA PROCESSING APPARATUS, PAGE DESCRIPTION DATA PROCESSING METHOD, AND RECORDING MEDIUM

CROSS-REFERENCE TO RELATED APPLICATION

This application is based upon and claims the benefit of priority from Japanese Patent Application No. 2010-079463 filed on Mar. 30, 2010, of which the contents are incorporated herein by reference.

BACKGROUND OF THE INVENTION

1. Field of the Invention

The present invention relates to a page description data processing apparatus, a page description data processing method, and a recording medium for performing a particular processing sequence on page description data having a certain attribute, from among page description data described by a page description language (PDL), for thereby converting the page description data into more robust page description data (hereinafter referred to as "fortified page description data").

2. Description of the Related Art

In recent years, DTP processes for setting characters and images generated by a user via a computer into one or more electronic pages using DTP (Desktop Publishing) application software installed on the computer have been widely used in printing and platemaking fields.

Such DTP application software generates page description data, which express images of respective pages based on elements such as characters and images that are edited by the user.

Page description data are defined by vector data independent of the resolution of an output machine such as a printer, a platesetter, or the like, and such data cannot be output per se from the output machine. Therefore, the page description data are rasterized by a RIP (Raster Image Processor) into raster image data comprising a cluster of dots representative of elements such as characters and images in the pages.

When raster image data are supplied to the output machine such as a printer, a platesetter, or the like, the output machine outputs a hard copy or a printing plate, which carries an image based on the raster image data (see Japanese Laid-Open Patent Publication No. 2005-070957).

PDF (Portable Document File) version 1.3, which forms one type of page description data, incorporates therein a "dotted line pattern" operator for controlling a pattern of line elements and gaps (non-line elements), which are utilized in stroking a linear path. The term "path" refers to a path having no intrinsic line width, and which interconnects a start point and an end point. The term "stroke" refers to a process of applying a certain line width to a path.

Variables which can be set by the "dotted line pattern" operator include a "dotted line array" for designating a length for line elements and gaps that appear alternately, and a "dotted line phase" for designating a plotted state at the start point of a periodic dotted line. For details, reference should be made to PDF Reference, second edition, Adobe Portable Document Format Version 1.3, initial edition, 1st printing, published July, 2000, Author: Adobe Systems, Publisher: Pearson Education, ISBN 0-201-61588-6, pages 136 and 141-143. The terms "dotted line array" and "dotted line phase" may hereinafter be referred to collectively as "dotted line configuration parameters."

The relationship between dotted line configuration parameters and a dotted line pattern that actually is plotted will be described in detail below with reference to FIG. 11A of the accompanying drawings, based on an example in which a linear path is stroked with 11 unit lengths from a start point to an end point thereof.

For example, in FIG. 11A, [4 2] {0} implies a coupling of parameters as a dotted line array [4 2] and a dotted line phase {0}. The dotted line array [4 2] represents turning-on of 4 successive unit lengths, followed by turning-off of 2 successive unit lengths. In other words, the dotted line pattern has a periodicity unit represented by 6 unit lengths. Stated otherwise, the dotted line pattern comprises a repetition of line elements, each of which are 4 unit lengths long, and gaps, each of which are 2 unit lengths long.

The dotted line phase {0} indicates that the above periodic dotted line pattern includes a phase shift of 0. The periodic dotted line pattern having such a dotted line phase {0} is illustrated in the upper section of FIG. 11A, whereas a periodic dotted line pattern having a dotted line phase {1} is illustrated in a middle section of FIG. 11A. The periodic dotted line pattern having the dotted line phase {1} is equivalent to the periodic dotted line pattern having the dotted line phase {0} if shifted one unit length to the left (toward the start point of the path). Similarly, a periodic dotted line pattern having a dotted line phase {2} is illustrated in a lower section of FIG. 11A, which is equivalent to the periodic dotted line pattern having the dotted line phase {0} if shifted two unit lengths to the left (toward the start point of the path).

According to PDF specifications, as illustrated above, the plotted configuration of a dotted line is determined sequentially based on a prescribed periodic repetition from the start point to the end point of the dotted line.

However, PDF specifications are susceptible to unexpected problems when a dotted line pattern generated along a linear path is rasterized.

For example, when the start point and the end point of each line element, i.e., the end point and the start point of each gap, are determined, the points may suffer a positional shift error, because the position of the start point or the end point differs from RIP to RIP. The positional shift error refers to a so-called processing error caused by different RIP processing algorithms or software versions. Accordingly, as shown in FIGS. 11B and 11C of the accompanying drawings, the number of generated line elements of one path may be different from the number of generated line elements of another path, even if the paths are of the same length.

In FIG. 11B, if an end point 202a of a line element 200a and an end point 202b of a line element 200b are different from each other due to processing errors, then a start point 206a of a line element 204a, which is adjacent to the line element 200a, exists at a position that lies beyond an end position 208 of the path, i.e., to the right side of the end position 208. Additionally, a start point 206b of a line element 204b, which is adjacent to the line element 200b, exists at a position that is not beyond the end position 208 of the path, i.e., to the left side of the end position 208.

FIG. 11C shows an upper dotted line, which is made up of the line element 200a and the next line element 204a, and a lower dotted line, which is made up of the line element 200b and the next line element 204b. The dotted lines are imparted with a certain line width by means of a stroking process.

As shown in FIG. 11C, a filled area 210a is formed around the line element 200a, and a filled area 210b also is formed around the line element 200b, according to a line width and a capping format (end processing format), which are preset in the stroking process.

However, a filled area is not formed around the next line element 204*a* following the start point 206*a* (the upper dotted line) because the start point 206*a* is positioned outside of the path. On the other hand, a filled area 212 having an oblong shape is formed around a portion of the next line element 204*b* following the start point 206*b* (the lower dotted line) because the start point 206*b* is positioned within the path.

As described above, when a dotted line pattern is formed along a linear path, a line element may be generated indeterminately in the vicinity of the end point of the linear path, depending on a combination of processing errors caused by the RIP processing algorithm, the software version, and dotted line configuration parameters. Consequently, the dotted line pattern may be converted unintentionally into a dotted line configuration. When the image data including the dotted line is rasterized, such an unintended dotted line configuration possibly may result in unexpected printing difficulties, the cause of which is difficult to analyze. Such a problem manifests itself in particular when the line width is large.

SUMMARY OF THE INVENTION

It is an object of the present invention to provide a page description data processing apparatus, a page description data processing method, and a recording medium, which make it possible to prevent printing difficulties from occurring in a process of rasterizing image data including a dotted line therein.

According to the present invention, there is provided a page description data processing apparatus comprising an object confirming unit which confirms whether or not page description data contains an object for stroking a path, an operator confirming unit which, if the page description data contains the object for stroking the path, confirms whether or not a dotted line pattern determining operator for determining a dotted line pattern is contained within the object, a line element start point position estimator which, if the dotted line pattern determining operator for determining the dotted line pattern is contained within the object, estimates the position of a start point of a line element formed along the path based on a path construction operator for constructing the path and the dotted line pattern determining operator, and a path end point position changer which, if the distance between the start point of the line element and an end point of the path is equal to or less than a prescribed threshold value, changes the position of the end point of the path to another position along the path in order to increase the distance.

As described above, if the distance between the start point of the line element and the end point of the path is equal to or less than the prescribed threshold value, then the path end point position changer changes the position of the end point of the path to another position along the path in order to increase the distance. Consequently, a line element either is generated or not generated at all times in the vicinity of the end point of the path, irrespective of the occurrence of processing errors during a rasterizing process of the RIP (raster image processor). In other words, a line element is prevented beforehand from being indeterminately generated. Thus, page description data are prevented from leading to printing difficulties during a rasterizing image data process, which includes dotted lines therein.

The line element start point position estimator preferably estimates the position of the start point of the line element, which is formed along a curved path. Since complex calculations are required in order to identify a curved configuration, and a line element is highly likely to be generated indeterminately near the end point of the path, the operation sequence of the line element start point position estimator is highly effective.

The path end point position changer uses a position, which preferably is predicted by extrapolating the path at another position.

The path end point position changer preferably determines the prescribed threshold value depending on a resolution utilized during rasterization of the page description data. Thus, the length of the line element can appropriately be controlled in the vicinity of the end point of the path.

According to the present invention, there is also provided a page description data processing method comprising the steps of confirming whether or not page description data contains an object for stroking a path, if the page description data contains the object for stroking the path, confirming whether or not a dotted line pattern determining operator for determining a dotted line pattern is contained within the object, if the dotted line pattern determining operator for determining the dotted line pattern is contained within the object, estimating the position of a start point of a line element formed along the path based on a path construction operator for constructing the path and the dotted line pattern determining operator, and if the distance between the start point of the line element and an end point of the path is equal to or less than a prescribed threshold value, changing the position of the end point of the path to another position along the path in order to increase the distance.

According to the present invention, there is further provided a recording medium storing therein a program that controls a computer to inspect an attribute of page description data and to perform a process depending on the inspected attribute on the page description data, the program enabling the computer to function as an object confirming unit which confirms whether or not the page description data contains an object for stroking a path, an operator confirming unit which, if the page description data contains the object for stroking the path, confirms whether or not a dotted line pattern determining operator for determining a dotted line pattern is contained within the object, a line element start point position estimator which, if the dotted line pattern determining operator for determining the dotted line pattern is contained within the object, estimates the position of a start point of a line element formed along the path based on a path construction operator for constructing the path and the dotted line pattern determining operator, and a path end point position changer which, if the distance between the start point of the line element and an end point of the path is equal to or less than a prescribed threshold value, changes the position of the end point of the path to another position along the path in order to increase the distance.

With the page description data processing apparatus, the page description data processing method, and the recording medium according to the present invention, it can be confirmed whether or not page description data contains an object for stroking a path. If the page description data contains the object for stroking the path, it then is confirmed whether or not a dotted line pattern determining operator for determining a dotted line pattern is contained within the object. If the dotted line pattern determining operator for determining the dotted line pattern is contained within the object, the position of a start point of a line element formed along the path is estimated based on a path construction operator for constructing the path and the dotted line pattern determining operator. If the distance between the start point of the line element and an end point of the path is equal to or less than a prescribed threshold value, the position of the end point of the path is changed to another position along the path in order to increase the distance. Consequently, a line element either is generated or not generated at all times in the vicinity of the end point of the path, irrespective of the occurrence of processing errors during a rasterizing process of the RIP (raster image processor). In other words, a line element is prevented beforehand from being indeterminately generated. Thus, page description data are prevented from leading to printing difficulties during a rasterizing image data process, which includes dotted lines therein.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A publishing system, which incorporates a page description data processing apparatus, a page description data processing method, and a recording medium according to an embodiment of the present invention, will be described in detail below with reference to the accompanying drawings.

Figure 1:
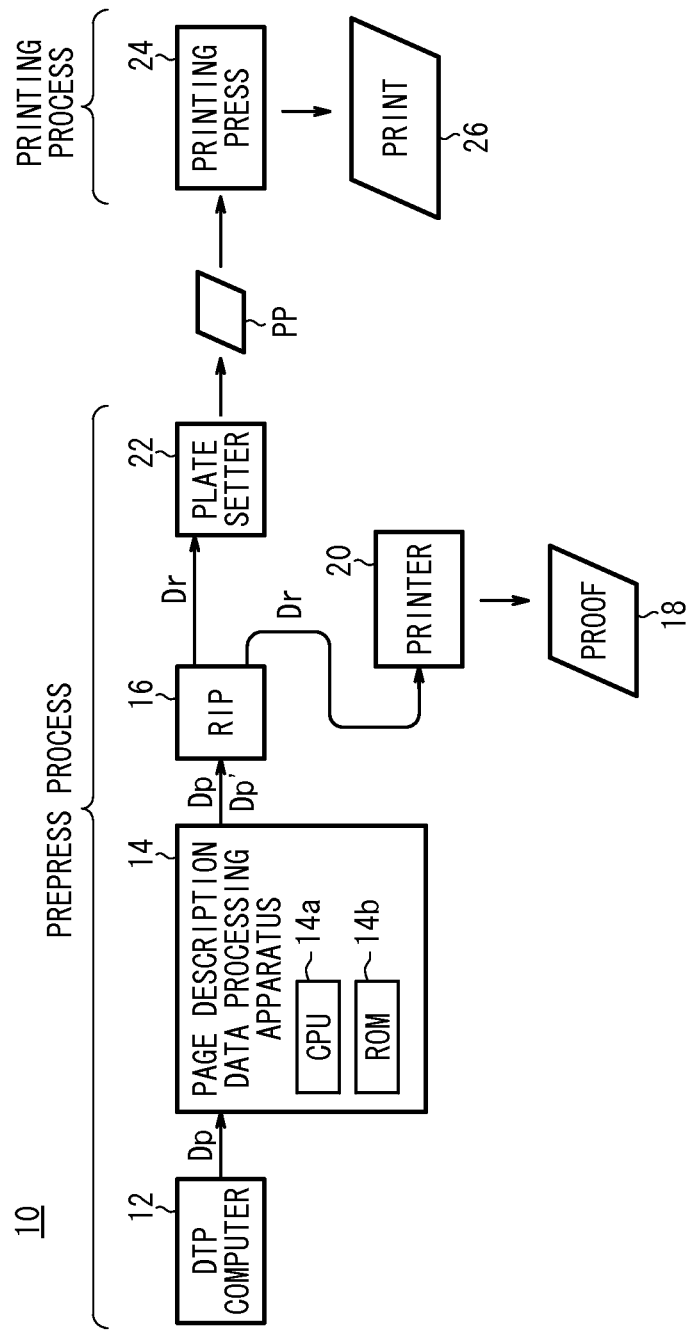
FIG. 1 is a block diagram of a publishing system, which carries out a page description data processing method according to an embodiment of the present invention.

FIG. 1 is a block diagram of a publishing system 10, which carries out a page description data processing method according to an embodiment of the present invention.

As shown in FIG. 1, the publishing system 10 is arranged to perform a prepress process, a printing process, and a bookbinding process (not shown).

The prepress process includes a DTP computer 12, a page description data processing apparatus 14 such as a personal computer or the like, a RIP 16, a printer 20, and a platesetter 22.

The DTP computer 12 generates page description data Dp, which expresses images of respective pages based on elements such as characters and images edited by the user.

The page description data processing apparatus 14 checks the contents (attributes) of the page description data Dp output from the DTP computer 12, performs a particular processing sequence on the page description data Dp, which includes a certain attribute based on the checked contents, and generates the processed page description data Dp as fortified (i.e., more robust) page description data Dp', or outputs the page description data Dp free of the certain attribute. Alternatively, processing functions of the page description data processing apparatus 14 may be incorporated in the DTP computer 12, in which case, the page description data processing apparatus 14 may be dispensed with.

The RIP 16 converts the page description data Dp or the fortified page description data Dp', which is output from the page description data processing apparatus 14, into raster image data Dr in C, M, Y, K colors.

Based on the raster image data Dr, the printer 20 prints a proof 18 as a hard copy.

If the proof 18 printed by the printer 20 is judged as acceptable by the user, then the platesetter 22 generates and outputs printing plates PP in C, M, Y, K colors from the raster image data Dr, which is output from the RIP 16 after the user turns on a start switch of the platesetter 22.

The printing process includes a printing press 24. The printing press 24 includes printing plates PP in C, M, Y, K colors mounted therein, which carry respective C, M, Y, K inks. The printing plates PP transfer the inks onto a sheet of paper, thereby producing a print 26 in multiple colors (four colors).

Figure 2:
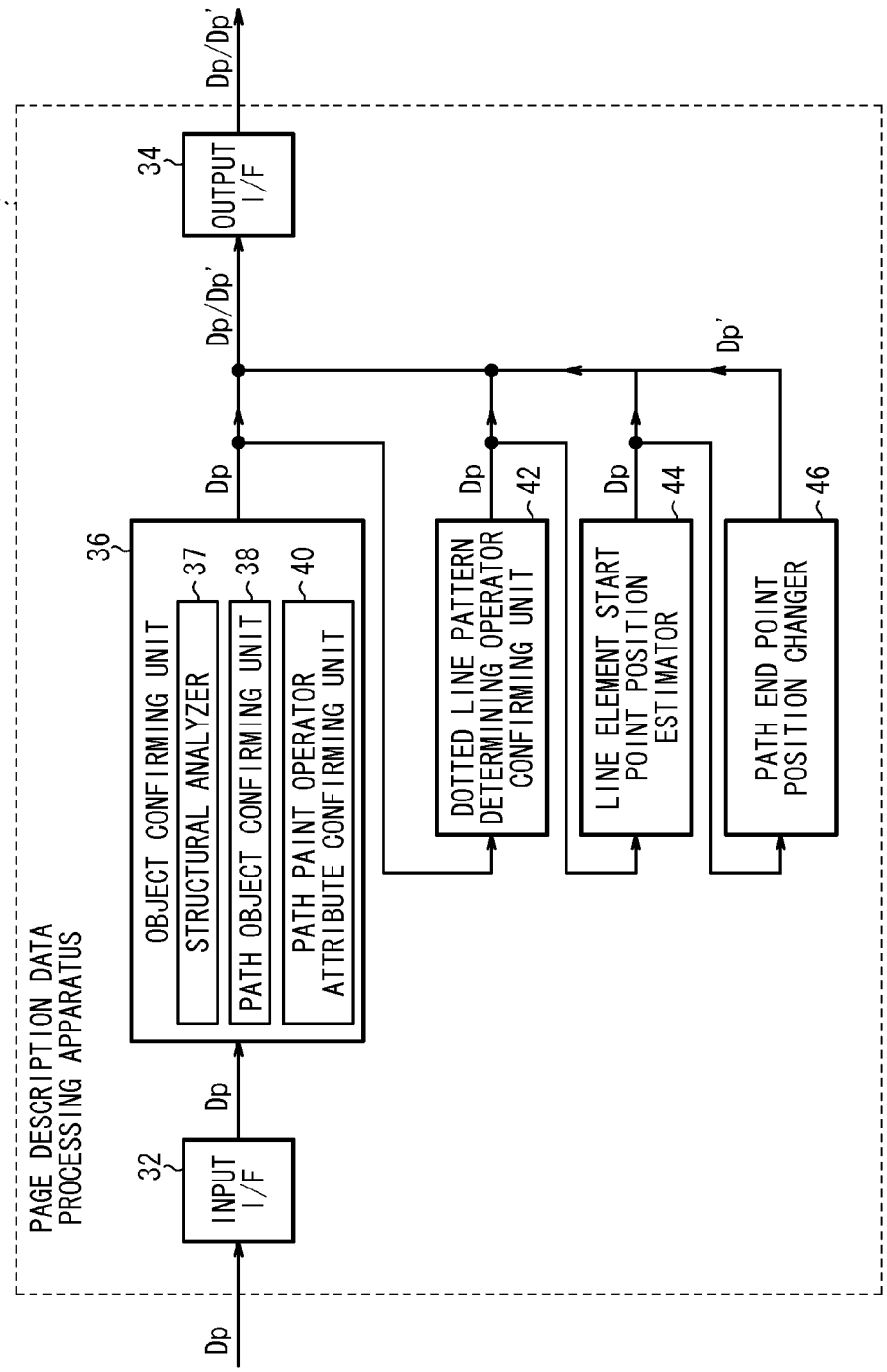
FIG. 2 is a functional block diagram of a page description data processing apparatus of the publishing system shown in FIG. 1.

FIG. 2 is a functional block diagram of the page description data processing apparatus 14. The page description data processing apparatus 14 has respective functions, which are performed when a CPU 14a (see FIG. 1) of the page description data processing apparatus 14 executes a program stored in a ROM 14b.

The program may be recorded in a computer-readable recording medium such as the ROM 14b, a hard disk, a CD-ROM, or the like. The program, which is recorded in the recording medium, may be read and run by a computer system. The computer system includes an OS (operating system) and hardware such as a CPU and peripheral devices. The computer-readable recording medium may also include a medium for dynamically holding programs for a short period of time, such as a communication line that transmits programs over a network such as the Internet or the like or a communication channel such as a telephone line, or a memory for holding programs for a certain period of time, such as a volatile memory in a computer system that serves as a server or a client in a network environment.

The page description data processing apparatus 14 generates fortified page description data Dp' by analyzing page description data Dp supplied via an input interface (input I/F) 32, or generates unchanged page description data Dp. The page description data processing apparatus 14 outputs the fortified page description data Dp' or the unchanged page description data Dp via an output interface (output I/F) 34.

The page description data processing apparatus 14 includes, in addition to the input and output interfaces 32, 34, an object confirming unit 36, which is involved in the analyzing process, a dotted line pattern determining operator confirming unit 42 (operator confirming unit), a line element start point position estimator 44, and a path end point position changer 46. The object confirming unit 36 comprises a structural analyzer 37, a path object confirming unit 38, and a path paint operator attribute confirming unit 40.

The term "path object" as used herein refers to an arbitrary configuration made up of a linear line, a rectangle, and a curve, e.g., a cubic Bezier curve.

The term "path paint operator" as used herein refers to an operator for finishing a path object, having an attribute either as an operator for applying a line width to a current path to plot a line (hereinafter referred to as "stroking operator" for illustrative purposes), or as an operator for filling a closed space generated by a current path (hereinafter referred to as "filling operator" for illustrative purposes).

The term "dotted line pattern determining operator" as used herein refers to an operator for setting a process for describing a dotted pattern when a path is stroked. According to PDF, one such operator "d" is defined. Defined variables, which can be set by the operator "d", include a "dotted line array" for designating a length for individual line elements and gaps that appear alternately, and a "dotted line phase" for designating a leading position as the start point of a dotted line. A situation in which the "dotted line pattern determining operator" is not included or does not exist is representative not only of the fact that the operator itself does not exist, but also that a variable representing a solid line is set in the operator, indicating that the pattern involved is not a dotted line pattern.

The term "path construction operator" as used herein refers to an operator for defining the physical configuration of a path. According to PDF, seven such operators "m", "l", "c", "v", "y", "h", and "re" are defined.

The term "curved path construction operator" as used herein refers to an operator for adding a curve to a current path from among the path construction operators. According to PDF, three such operators "c", "v", and "y" are defined, each of which serves to add a curve to a cubic Bezier curve.

The term "linear path construction operator" as used herein refers to an operator for adding a linear line to a current path from among the path construction operators. According to PDF, one such operator "l" is defined.

Figure 3:
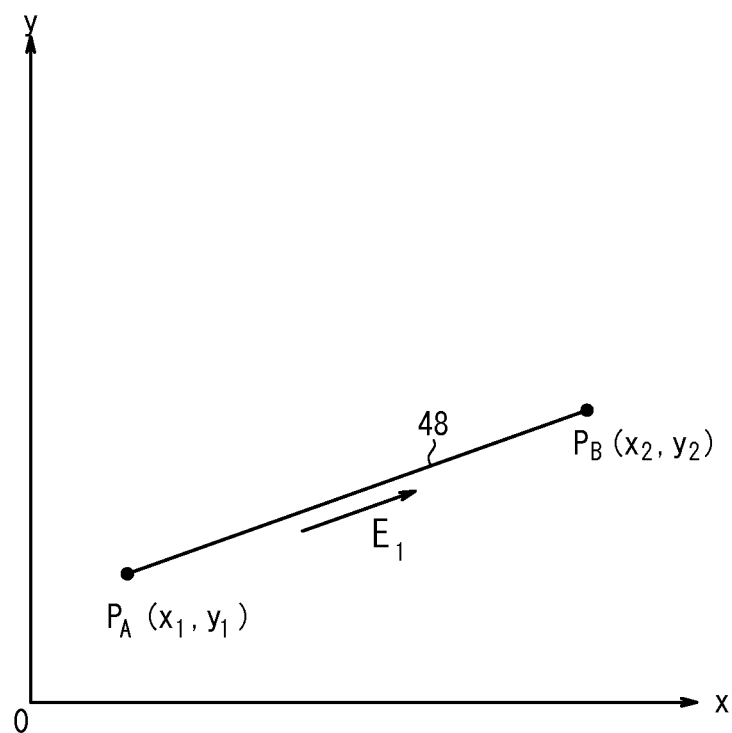
FIG. 3 is a diagram showing a linear path that is generated by a linear stroke operator.

FIG. 3 is a diagram showing a linear line, which is generated by the operator "l". The linear path, which is denoted by reference numeral 48 in FIG. 3, is defined by a start point $P_A$ ($x_1$, $y_1$) and an end point $P_B$ ($x_2$, $y_2$).

The linear path 48, which interconnects the start point $P_A$ and the end point $P_B$, is generated by changing the value of a variable t from 0 to 1. The coordinates P (x(t), y(t)) of a point on the linear path 48, which are dependent on the variable t, are calculated according to the following equations (1) and (2):

$$x(t)=(1-t)x_1+tx_2 \quad (1)$$

$$y(t)=(1-t)y_1+ty_2 \quad (2)$$

Since, from the equations (1) and (2), $x(0)=x_1$, $y(0)=y_1$, $x(1)=x_2$, and $y(1)=y_2$, when the variable t changes from 0 to 1, the point P on the linear path 48 moves continuously from the start point $P_A$ to the end point $P_B$, along the direction indicated by the arrow $E_1$ in FIG. 3.

Figure 4:
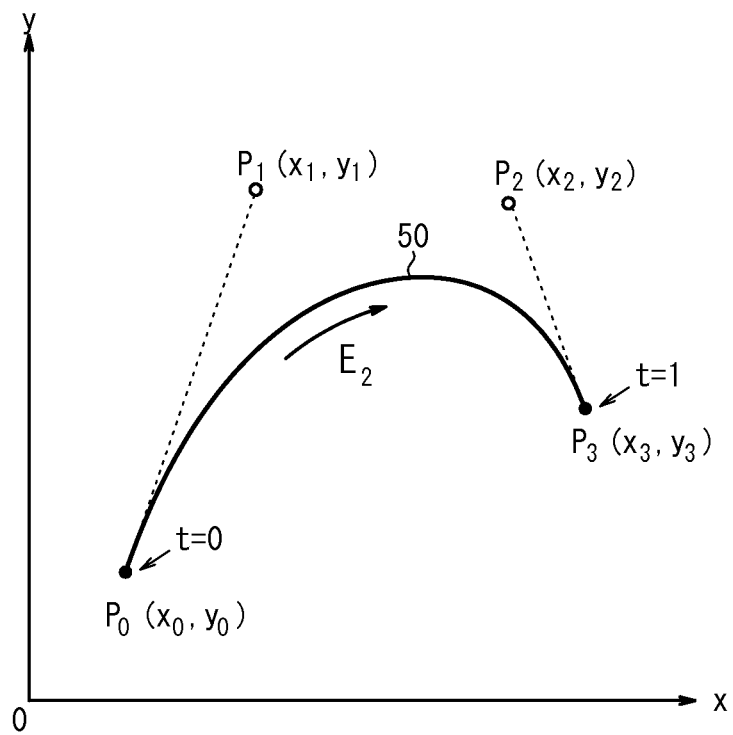
FIG. 4 is a diagram showing a curved path represented by a cubic Bezier curve, which is generated by a curve stroke operator.

FIG. 4 is a diagram showing a cubic Bezier curve, which is generated by the operator "c". The cubic Bezier curve, or a curved path, denoted by 50 in FIG. 4, is defined by two terminal points, i.e., start and end points, $P_0$ ($x_0$, $y_0$), $P_3$ ($x_3$, $y_3$), and by two control points $P_1$ ($x_1$, $y_1$), $P_2$ ($x_2$, $y_2$).

The curved path 50, which interconnects the start point $P_0$ and the end point $P_3$, is generated when a variable t changes from 0 to 1. The coordinates P (x(t), y(t)) of a point P on the path 50, which are dependent on the variable t, are calculated by the following equations (3) and (4):

$$x(t)=(1-t)^3x_0+3t(1-t)^2x_1+3t^2(1-t)x_2+t^3x_3 \quad (3)$$

$$y(t)=(1-t)^3y_0+3t(1-t)^2y_1+3t^2(1-t)y_2+t^3y_3 \quad (4)$$

Since, from equations (3) and (4), $x(0)=x_0$, $y(0)=y_0$, $x(1)=x_3$, and $y(1)=y_3$, when the variable t changes from 0 to 1, the point P on the curve path 50 moves continuously from the start point $P_0$ to the end point $P_3$, along the direction indicated by the arrow $E_2$. A line segment $P_0P_1$ indicated by the broken line is a line that is tangential to the curved path 50 at the start point $P_0$. A line segment $P_2P_3$ indicated by the broken line is a line that is tangential to the curved path 50 at the end point $P_3$.

The publishing system 10 basically is constructed as described above. Operations of the page description data processing apparatus 14 of the publishing system 10 will be described below with reference to the flowchart shown in FIG. 5, as well as the functional block diagram shown in FIG. 2.

Figure 5:
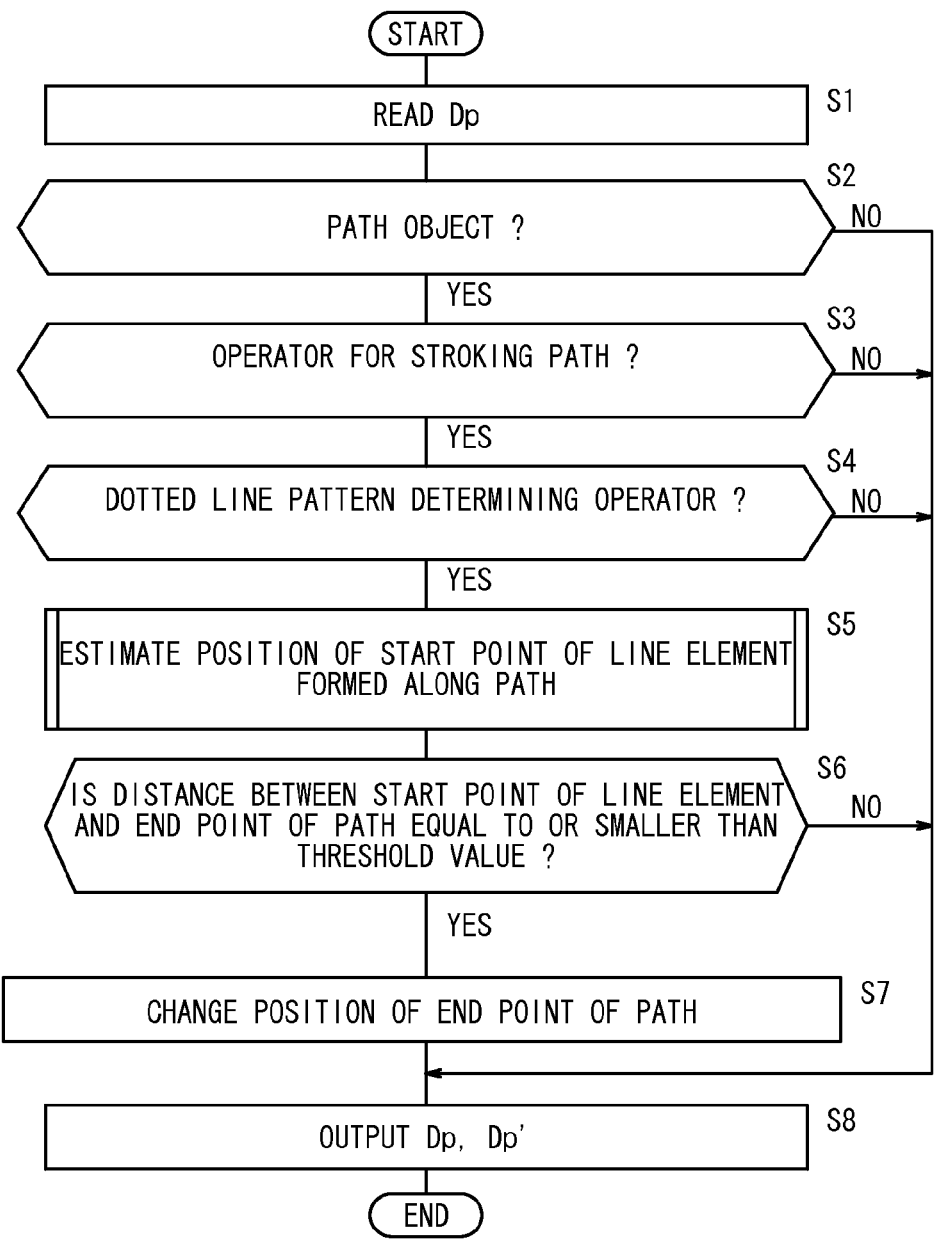
FIG. 5 is a flowchart of an operation sequence of the page description data processing apparatus shown in FIG. 2.

In step S1 shown in FIG. 5, the page description data processing apparatus 14 reads page description data Dp, page by page, which are output from the DTP computer 12.

In step S2, the structural analyzer 37 analyzes the structure of the page description data Dp and extracts an object contained within the pages. Thereafter, the path object confirming unit 38 confirms whether or not a path object is contained within the extracted object. If a path object is not contained within the extracted object, then in step S8, the path object confirming unit 38 outputs page description data Dp, which is unchanged, via the output interface 34.

If a path object is contained within the extracted object, then in step S3, the path paint operator attribute confirming unit 40 confirms whether or not a stroking operator, e.g., an operator "S", "s", or the like, is contained within the path object. If a stroking operator is not contained within the path object, or in other words, if a filling operator "f", "F" or the like is contained within the path object, then in step S8, the path paint operator attribute confirming unit 40 outputs page description data Dp, which is unchanged, via the output interface 34.

If a stroking operator is contained within the path object, then in step S4, the dotted line pattern determining operator confirming unit 42 confirms whether or not a dotted line pattern determining operator, i.e., an operator "d", is contained within the path object. If a dotted line pattern determining operator is not contained within the path object, then in step S8, the dotted line pattern determining operator confirming unit 42 outputs page description data Dp, which is unchanged, via the output interface 34.

If a dotted line pattern determining operator is contained within the path object, then in step S5, the line element start point position estimator 44 estimates the position of the start point of a line element generated along the path, based on the path object confirmed in step S2, along with the dotted line pattern determining operator that was confirmed in step S4. An estimating process, which is carried out by the line element start point position estimator 44, will be described below with reference to the flowchart shown in FIG. 6.

Figure 6:
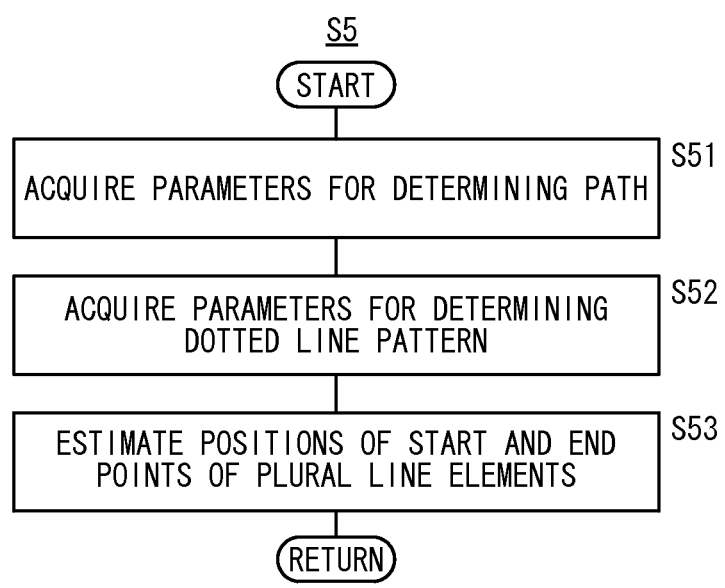
FIG. 6 is a flowchart of a process for replacing a path construction operator.

In step S51 shown in FIG. 6, the line element start point position estimator 44 acquires parameters for determining a path from the path construction operator. In the example shown in FIG. 3, parameters that are acquired in step S51 by the line element start point position estimator 44 include the operator attribute "l", the start point $P_A$ ($x_1$, $y_1$), and the end point $P_B$ ($x_2$, $y_2$). In the example shown in FIG. 4, parameters that are acquired in step S51 by the line element start point position estimator 44 include the operator attributes "c", "v", or "y", the start point $P_o$ ($x_0$, $y_0$), the end point $P_3$ ($x_3$, $y_3$), the control point $P_1$ ($x_1$, $y_1$), and the control point $P_2$ ($x_2$, $y_2$).

Furthermore, in order to establish a correspondence between a user space (device-independent coordinate system) and a device space (device-dependent coordinate system), the line element start point position estimator 44 also acquires vertical and horizontal rasterizing resolutions. The resolutions may be in units such as dpi (dot per inch), ppi (pixel per inch), or the like.

In step S52, the line element start point position estimator 44 acquires parameters for determining a dotted line pattern. The parameters that are acquired in step S52 by the line element start point position estimator 44 include "dotted line array" and "dotted line phase" (dotted line configuration parameters) set in the operator "d".

In step S53, the line element start point position estimator 44 estimates the positions of start and end points of a plurality of line elements. A process for estimating the position of the start point of a line element within the user space will be described in detail below.

If the coordinates of the point P on the paths 48, 50 are represented by (x(t), y(t)), then the length l(u, v) of a line segment of the paths 48, 50 within an interval [u, v] is calculated according to the following equation (5):

$$l(u, v) = \int_u^v \sqrt{\{x'(t)\}^2 + \{y'(t)\}^2} \, dt \quad (5)$$

where $0 \leq u \leq 1$, $0 \leq v \leq 1$. The position of the start point of the line element can be estimated based on equation (5).

An operation sequence of the line element start point position estimator 44, for estimating positions of the start and end points of line elements in the example of the linear path 48 shown in FIG. 3, will be described below.

Figure 7A:
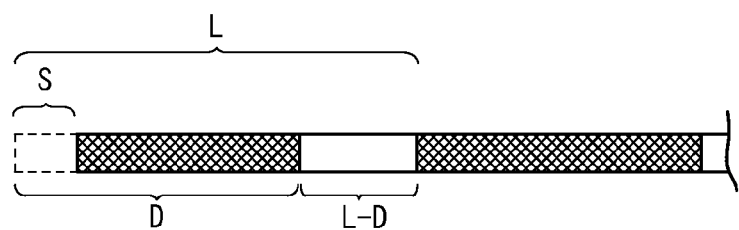
FIG. 7A is a diagram showing dotted line configuration parameters by way of example.

As shown in FIG. 7A, it is assumed that dotted line configuration parameters are set to [D L-D] {S} where D, L and S are positive numbers, which may be of either integer or real values.

Figure 7B:
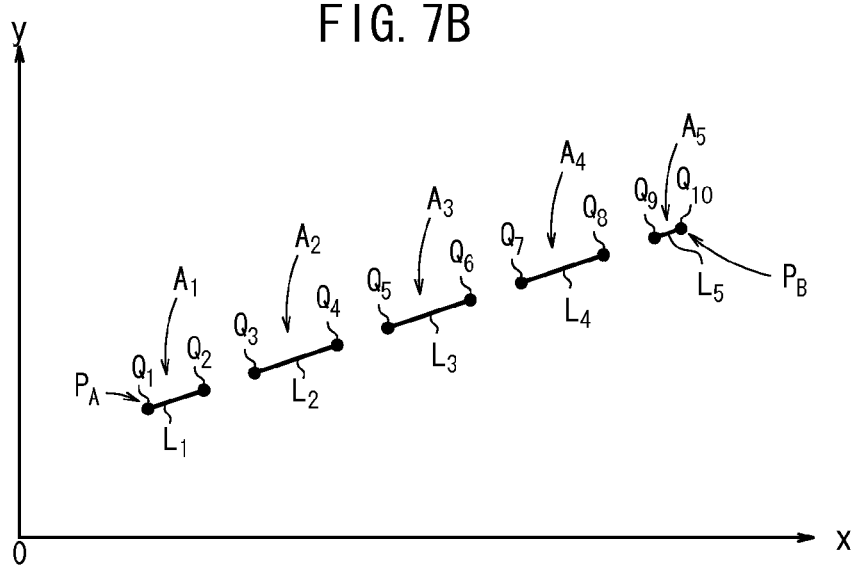
FIG. 7B is a diagram showing a dotted line pattern, which is generated along the linear line shown in FIG. 3.

As shown in FIG. 7B, the configurations of five line elements $A_1$ through $A_5$, or more specifically, the positions of start points $\{Q_1, Q_3, Q_5, Q_7, Q_9\}$ and end points $\{Q_2, Q_4, Q_6, Q_8, Q_{10}\}$ thereof, can be estimated based on the start point $P_A$ ($x_1$, $y_1$), the end point $P_B$ ($x_2$, $y_2$), and the above dotted line configuration parameters. A process of estimating the configurations of five line elements $A_1$ through $A_5$ will be described in detail below.

First, the position of the start point $Q_1$ of the line element $A_1$, which has a length $L_1$, and which serves as a plotting start position, can be estimated as the position ($t_1=0$) of the start position $P_A$ of the path 48. Then, $t_2$, which satisfies the relation $I(t_1, t_2)=D-S$, is calculated, and a position corresponding to $t=t_2$ is calculated according to equations (1) and (2). The position of the end point $Q_2$ of the line element $A_1$ can be estimated as a position (x($t_2$), y($t_2$)).

Then, $t_3$, which satisfies the relation $I(t_2, t_3)=L-D$, is calculated, and a position corresponding to $t=t_3$ is calculated according to equations (1) and (2). The position of the start point $Q_3$ of the line element $A_2$, which has a length $L_2$, can be estimated as a position (x($t_3$), y($t_3$)). Then, $t_4$, which satisfies the relation $I(t_3, t_4)=D$, is calculated, and a position corresponding to $t=t_4$ is calculated according to equations (1) and (2). The position of the end point $Q_4$ of the line element $A_2$ can be estimated as a position (x($t_4$), y($t_4$)).

Similarly, the coordinates of the start points $\{Q_1, Q_3, Q_5, Q_7, Q_9\}$ and the end points $\{Q_2, Q_4, Q_6, Q_8, Q_{10}\}$ are estimated. In the present embodiment, positions of both start and end points of the line elements are estimated. However, positions of only the start points may be estimated, while positions of the end points are not estimated.

An operation sequence of the line element start point position estimator 44, for estimating positions of start and end points of line elements in the example of the curved path 50 shown in FIG. 4, will be described below. Since complex calculations are required in order to identify a curved configuration, and a line element is highly likely to become uncertain near the end point of the path 50, the operation sequence of the line element start point position estimator 44 is highly effective. It is assumed that, dotted line configuration parameters are set as shown in FIG. 7A.

Figure 8:
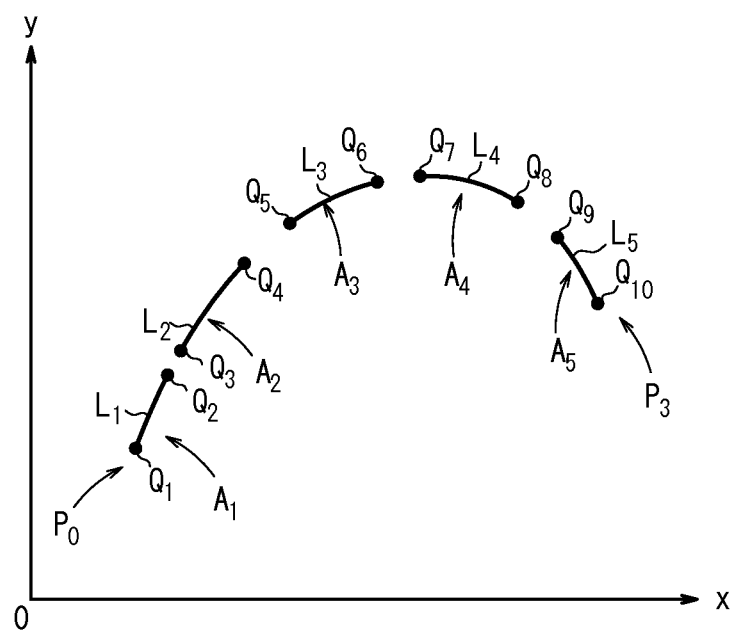
FIG. 8 is a diagram showing a dotted line pattern, which is generated along the curved path shown in FIG. 4.

As shown in FIG. 8, the configurations of five line elements $A_1$ through $A_5$, or more specifically, the coordinates of start points $\{Q_1, Q_3, Q_5, Q_7, Q_9\}$ and end points $\{Q_2, Q_4, Q_6, Q_8, Q_{10}\}$ thereof, can be estimated based on the start point $P_0$ ($x_0$, $y_0$), the end point $P_3$ ($x_3$, $y_3$), and the above dotted line configuration parameters. A process of estimating the configurations of five line elements $A_1$ through $A_5$ will be described in detail below.

First, as a plotting start position, the position of the start point $Q_1$ of the line element $A_1$, which has a length $L_1$, can be estimated as the position ($t_1=0$) of the start position $P_0$ of the path 50. Then, $t_2$, which satisfies the relation $I(t_1, t_2)=D-S$, is calculated, and a position corresponding to $t=t_2$ is calculated according to equations (3) and (4). The position of the end point $Q_2$ of the line element $A_1$ can be estimated as the position (x($t_2$), y($t_2$)).

Then, $t_3$, which satisfies the relation $I(t_2, t_3)=L-D$, is calculated, and a position corresponding to $t=t_3$ is calculated according to equations (3) and (4). The position of the start point $Q_3$ of the line element $A_2$, which has a length $L_2$, can be estimated as a position (x($t_3$), y($t_3$)). Then, $t_4$, which satisfies the relation $I(t_3, t_4)=D$, is calculated, and a position corresponding to $t=t_4$ is calculated according to equations (3) and (4). The position of the end point $Q_4$ of the line element $A_2$ can be estimated as a position (x($t_4$), y($t_4$)).

Similarly, the coordinates of the start points ($Q_1, Q_3, Q_5, Q_7, Q_9$) and the end points $\{Q_2, Q_4, Q_6, Q_8, Q_{10}\}$ are estimated in the same manner.

One curved path construction operator may be replaced with a plurality of linear path construction operators corresponding to a polygonal path, and the above estimating process may be performed based on the plurality of linear path construction operators. Such an alternative approach requires simpler calculations and results in a shorter processing time.

As described above, the positions of the start and end points of the line elements formed along the paths 48, 50 are estimated in step S5 of FIG. 5.

In step S6 of FIG. 5, the path end point position changer 46 determines whether or not the distance between the start points of the line elements and the end points of the paths 48, 50 is equal to or less than a prescribed threshold value. If the distance is greater than the threshold value, then in step S8, the path end point position changer 46 outputs the page description data Dp as is, i.e., without changes thereto, via the output interface 34.

In step S7, if the distance is equal to or less than the threshold value, then the path end point position changer 46 changes the position of the end point of the path to another position along the path, so as to increase the distance between the start point of the line element and the end point of the path. Specific examples, in which the position of the end point of the path is changed, and advantages attributable thereto, will be described below with reference to FIGS. 9A through 9E.

Figure 9A:
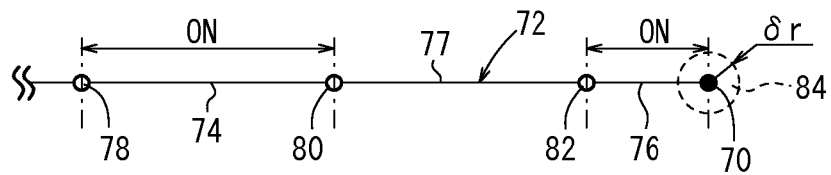
FIGS. 9A through 9E are diagrams showing specific examples in which the position of an end point of a path is changed.

As shown in FIG. 9A, if a path 72, which extends up to an end point 70, is to be stroked by a dotted line pattern, then line elements 74, 76 are formed within ranges indicated by "ON". In a range other than the ranges indicated by "ON", a non-line element 77 is formed as a gap between adjacent line elements. For example, it is assumed that a round cap is applied around each of a start point 78 and an end point 80 of the line element 74, and around each of a start point 82 and the end point 70 of the line element 76, which agrees with the end point 70 of the path 72. The term "round cap" refers to a capping process for drawing a semicircular arc having a diameter equal to a line width around an end point, and filling the semicircular arc. For details, reference should be made to PDF Reference, second edition, Adobe Portable Document Format Version 1.3, initial edition, 1st printing, published July, 2000, Author: Adobe Systems, Publisher: Pearson Education, ISBN 0-201-61588-6, page 139.

In step S6 (see FIG. 5), the path end point position changer 46 determines whether or not the start points 78, 82 of the line elements 74, 76 fall within a decision area 84. The path end point position changer 46 may also determine whether or not the start points of all of the line elements of the dotted line fall within the decision area 84. Alternatively, the path end point position changer 46 may extract a line element, the start point of which is closest to the end point 70 of the path 72, i.e., the line element 76, and may determine whether or not the start point 82 of the line element 76 falls within the decision area 84.

The decision area 84 refers to a circular area having a radius δr, whose center resides at the end point 70 of the path 72. In FIG. 9A, since each of the start points 78, 82 of the line elements 74, 76 is positioned outside of the decision area 84, the stroking process and the capping process are carried out without changing the path 72.

Figure 9B:
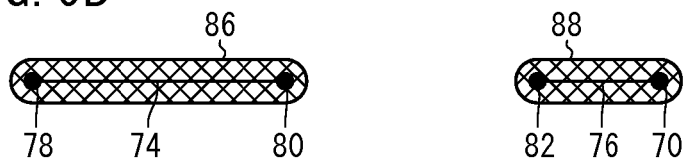

As a result, as shown in FIG. 9B, the line elements 74, 76 are stroked along the path 72 in order to apply a prescribed line width thereto, forming filled areas 86, 88. Semicircular caps are applied respectively to the start points 78, 82 and to the end points 80, 70.

Figure 9C:
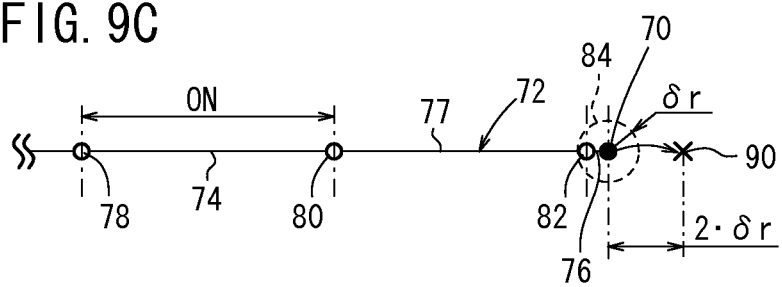
Figure 9D:
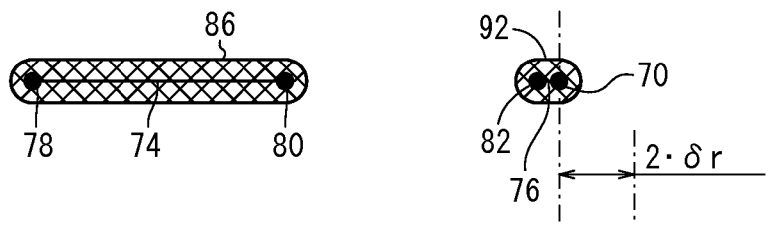

In this case, it is assumed that the start point 82 of the line element 76 falls within the decision area 84, as shown in FIG. 9C. If the line elements 74, 76 are stroked and capped in the manner described with reference to FIGS. 9A and 9B, then filled areas 86, 92 are formed, as shown in FIG. 9D.

Inasmuch as the start point 82 and the end point 70 are extremely close to each other, the line element 76 is short and the filled area 92 occupies a small area. In this case, due to processing errors of the RIP 16, the positional relationship between the start point 82 and the end point 70 may change, possibly resulting in the start point 82 becoming positioned outside of the path 72. Therefore, the line element 76 (the filled area 92) may be indeterminately generated.

To solve this problem, the path end point position changer 46 changes the position of the end point 70 to the position of a new end point 90, thereby increasing the distance between the start point 82 of the line element 76 and the end point 70 of the path 72. More specifically, the path end point position changer 46 moves the position of the end point a prescribed distance along the direction in which the path 72 extends, i.e., in the direction from the start point toward the end point of the path 72. For example, the prescribed distance may be equal to the diameter (=2·δr) of the circular decision area 84.

The value of δr is determined in view of processing errors caused by the RIP 16. For example, the value of δr should preferably be set to a value corresponding to 7200 dpi with respect to high resolution image data in a range from 2400 to 4800 dpi. Alternatively, the value of δr may be determined depending on the value of a rasterizing resolution Δ, since doing so allows the length of the line element 76 to be appropriately controlled in the vicinity of the end point 70 of the path 72.

Figure 9E:
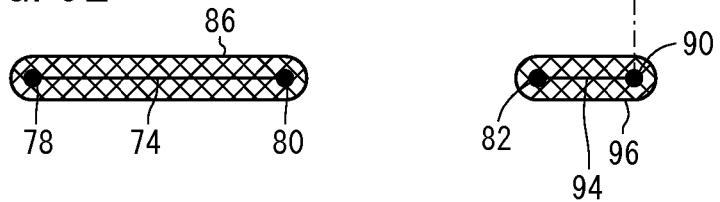

As a consequence, as shown in FIG. 9E, a new line element 94, which is generated in the foregoing manner by moving the position of the end point, is longer than the line element 76 (see FIG. 9D) by 2·δr. Even if the length of the new line element 94 is varied, especially if shortened, due to processing errors caused by the RIP 16, since the new line element 94 necessarily exists as an element of the dotted line pattern, a filled area 96 is always formed. Therefore, the line element 76 (the filled area 92) is prevented beforehand from being indeterminately generated.

According to the above process for dealing with the situation shown in FIG. 9C, a position predicted by extrapolating the path 72 beyond the end point 70 is determined as the new end point 90. A known algorithm may be applied to such an extrapolating process.

For example, the new end point 90 may have coordinates (x, y), which are generated by substituting $t=1+\delta t$ (where $\delta t$ indicates a minute positive value) in equations (1) through (4) described above. In this manner, appropriate line elements are formed along the paths 48, 50 (see FIGS. 3 and 4).

Figure 10A:
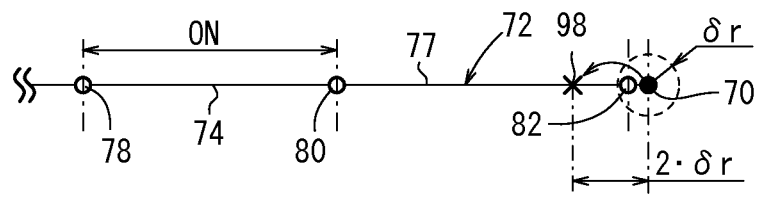
FIGS. 10A through 10C are diagrams showing other specific examples in which the position of an end point of a path is changed.
Figure 10B:
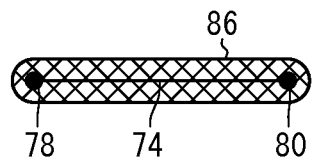
Figure 10C:
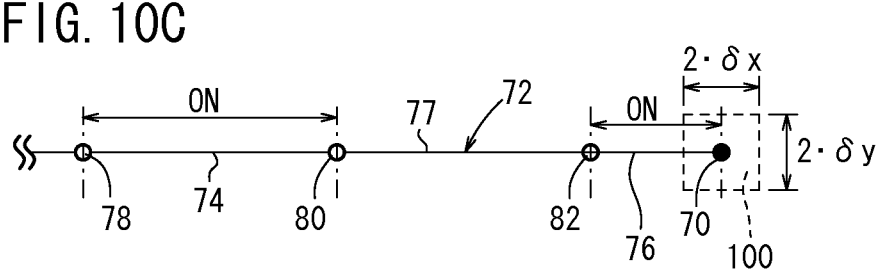
Figure 11A:
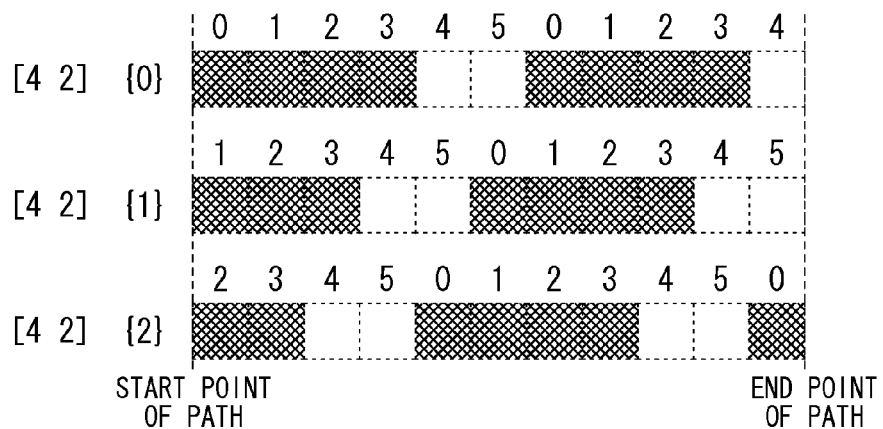
FIG. 11A is a diagram showing the relationship between dotted line configuration parameters and a dotted line pattern that actually is plotted.
Figure 11B:
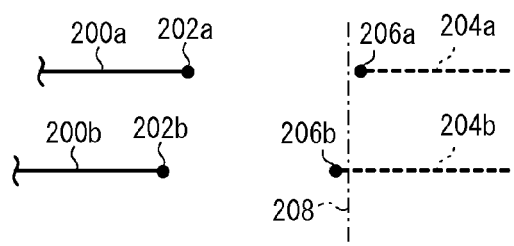
FIGS. 11B and 11C are diagrams showing dotted line patterns generated by imparting a certain line width to linear paths according to a stroking process.
Figure 11C:
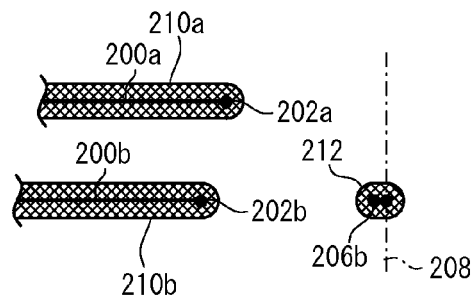

Other specific examples, in which the position of the end point of a path is changed, are illustrated in FIGS. 10A through 10C.

As shown in FIG. 10A, a new end point 98 may be set at a position on the path 72, thereby shortening the path 72. In this case, as shown in FIG. 10B, since the start point 82 does not exist within the range of the new shortened path, the filled area 96 that is shown in FIG. 9E is not formed at all times. Consequently, a line element (a filled area) is prevented beforehand from being indeterminately generated.

Alternatively, as shown in FIG. 10C, a rectangular decision area 100 may be used in place of the circular decision area 84 (see FIGS. 9A and 9C). Threshold values δx, δy, which are provided by the rectangular decision area 100 along horizontal and vertical directions, i.e., along x-axis and y-axis directions, may be identical to or different from each other. The decision areas 84, 100 are symmetrical about the end point 70. However, a decision area, which is asymmetrical about the end point 70, may also be employed.

As described above, in step S7 of FIG. 5, the path end point position changer 46 changes the position of the end point 70 of the path 72. More specifically, the path end point position changer 46 replaces coordinates of the end point 70 of the path construction operator with coordinates of the other end point 90, which has been determined as described above (see FIG. 9C).

Then, in step S8, the path end point position changer 46 outputs the page description data Dp', the path end point of which is changed via the output interface 34.

Therefore, as shown in FIG. 1, the page description data Dp, which are supplied to the page description data processing apparatus 14, are supplied to the RIP 16 either as unchanged page description data Dp, or as page description data Dp' with the path construction operator thereof being replaced. As a result, the page description data processing apparatus 14 can stably output the page description data Dp or the page description data Dp', which includes therein the filled area 96 (see FIG. 9E), or is free of any filled area (see FIG. 10B).

As described above, the page description data processing apparatus 14 confirms whether or not the page description data Dp contains an object for stroking the paths 48, 50, confirms whether or not a dotted line pattern determining operator for determining a dotted line pattern is contained within the object, estimates the positions of the start points $\{Q_1, Q_3, Q_5, Q_7, Q_9\}$ of line elements $A_1$ through $A_5$ formed along the paths 48, 50 based on the path construction operator, which operates to construct the paths 48, 50, and the dotted line pattern determining operator. Then, if the distance between the start points $\{Q_1, Q_3, Q_5, Q_7, Q_9\}$ and the end points $P_B$, $P_3$ of the paths 48, 50 is equal to or less than a prescribed threshold value, the page description data processing apparatus 14 changes the position of the end points $P_B$, $P_3$ of the paths 48, 50 to another position along the paths 48, 50 in order to increase the distance. Therefore, a line element either is generated or not generated at all times in the vicinity of the end points of the paths 48, 50, irrespective of the occurrence of processing errors during a rasterizing process of the RIP 16. In other words, a line element, particularly the line element $A_5$, is prevented beforehand from being indeterminately generated. Thus, the page description data are prevented from leading to printing difficulties during a rasterizing image data process, which includes dotted lines therein.

While page description data in accordance with a PDF format have been described above, the present invention is not limited to PDF, but may also be applicable to other page description languages, such as PostScript (registered trademark of Adobe Systems Inc.) and XPS (XML Paper Specification).

In the illustrated embodiment, the positions of the end points of the paths 48, 50 are changed. However, alternatively, the positions of the start points $P_4$, $P_0$ of the paths 48, 50 may be changed to other positions along the paths 48, 50.

Although a certain preferred embodiment of the present invention has been shown and described in detail, it should be understood that various changes and modifications may be made to the embodiment without departing from the scope of the invention as set forth in the appended claims.

What is claimed is:

1. A page description data processing apparatus comprising:
    an object confirming computing unit which confirms whether or not page description data contains an object for stroking a path;
    an operator confirming computing unit which, if the page description data contains the object for stroking the path, confirms whether or not a dotted line pattern determining operator for determining a dotted line pattern that is formed along the path within the object and has a periodic repetition of line elements and gaps is contained within the object;
    a line element start point position estimator computing unit which, if the dotted line pattern determining operator for determining the dotted line pattern is contained within the object, estimates the position of a start point of each of the line elements formed along the path based on a path construction operator for constructing the path and the dotted line pattern determining operator; and
    a path end point position changer computing unit which, if the distance between an end point of the path and the start point of one of the line elements closest to the end point of the path is equal to or less than a prescribed threshold value, changes the position of the end point of the path to another position along the path in order to increase the distance, while maintaining a phase of the periodic repetition at a start point of the path,
    wherein the path end point position changer computing unit determines the prescribed threshold value depending on a resolution utilized during rasterization of the page description data.

2. The page description data processing apparatus according to claim 1, wherein the line element start point position estimator computing unit estimates the position of the start point of the line element formed along a curved path.

3. A page description data processing method, performed by a page description data processing apparatus, comprising the steps of:
    confirming whether or not page description data contains an object for stroking a path;
    if the page description data contains the object for stroking the path, confirming whether or not a dotted line pattern determining operator for determining a dotted line pattern that is formed along the path within the object and has a periodic repetition of line elements and gaps is contained within the object;
    if the dotted line pattern determining operator for determining the dotted line pattern is contained within the object, estimating the position of a start point of each of the line elements formed along the path based on a path construction operator for constructing the path and the dotted line pattern determining operator; and
    if the distance between an end point of the path and the start point of one of the line elements closest to the end point of the path is equal to or smaller than a prescribed threshold value, changing the position of the end point of the path to another position along the path in order to increase the distance, while maintaining a phase of the periodic repetition at a start point of the path.

4. A non-transitory recording medium storing therein a program that controls a computer to inspect an attribute of page description data and to perform a process depending on the inspected attribute on the page description data, the program enabling the computer to function as:
    an object confirming computing unit which confirms whether or not page description data contains an object for stroking a path;
    an operator confirming computing unit which, if the page description data contains the object for stroking the path, confirms whether or not a dotted line pattern determining operator for determining a dotted line pattern that is formed along the path within the object and has a periodic repetition of line elements and gaps is contained within the object;
    a line element start point position estimator computing unit which, if the dotted line pattern determining operator for determining the dotted line pattern is contained within the object, estimates the position of a start point of each of the line elements formed along the path based on a path construction operator for constructing the path and the dotted line pattern determining operator; and
    a path end point position changer computing unit which, if the distance between an end point of the path and the start point of one of the line elements closest to the end point of the path is equal to or less than a prescribed threshold value, changes the position of the end point of the path to another position along the path in order to increase the distance, while maintaining a phase of the periodic repetition at a start point of the path.

5. The page description data processing apparatus according to claim 1, wherein the path end point position changer computing unit uses a position predicted by extrapolating the path as the other position.

6. The page description data processing apparatus according to claim 5, wherein the path and end point position changer computing unit uses a position on an extrapolated line of the path as the other position.

7. The page description data processing apparatus according to claim 1, wherein the path end point position changer computing unit changes the position of the end point of the path to shorten the path.

* * * * *